(12) United States Patent
Chen et al.

(10) Patent No.: US 11,028,214 B2
(45) Date of Patent: Jun. 8, 2021

(54) SYNTHESIS OF OLIGOMER FOR OPTICAL FIBER COATING

(71) Applicant: Corning Incorporated, Corning, NY (US)

(72) Inventors: Yangbin Chen, Saint Paul, MN (US); Bin Yang, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 110 days.

(21) Appl. No.: 16/245,736

(22) Filed: Jan. 11, 2019

(65) Prior Publication Data

US 2019/0225732 A1 Jul. 25, 2019

Related U.S. Application Data

(60) Provisional application No. 62/619,976, filed on Jan. 22, 2018.

(30) Foreign Application Priority Data

Feb. 21, 2018 (NL) ..................................... 2020470

(51) Int. Cl.
| | |
|---|---|
| *C08G 18/09* | (2006.01) |
| *C08G 18/71* | (2006.01) |
| *C08G 18/32* | (2006.01) |
| *C09D 175/16* | (2006.01) |
| *C08G 18/81* | (2006.01) |
| *C08G 18/48* | (2006.01) |
| *G02B 6/02* | (2006.01) |
| *C08G 18/24* | (2006.01) |
| *C08F 290/06* | (2006.01) |
| *C03C 25/106* | (2018.01) |

(52) U.S. Cl.
CPC ............ *C08G 18/09* (2013.01); *C03C 25/106* (2013.01); *C08F 290/067* (2013.01); *C08G 18/246* (2013.01); *C08G 18/3206* (2013.01); *C08G 18/4808* (2013.01); *C08G 18/4825* (2013.01); *C08G 18/4833* (2013.01); *C08G 18/711* (2013.01); *C08G 18/714* (2013.01); *C08G 18/8116* (2013.01); *C09D 175/16* (2013.01); *G02B 6/02395* (2013.01); *C08G 2115/00* (2021.01)

(58) Field of Classification Search
CPC . C08G 18/09; C08G 18/3206; C08G 18/4825
See application file for complete search history.

(56) References Cited

U.S. PATENT DOCUMENTS

| | | | |
|---|---|---|---|
| 4,233,425 | A | 11/1980 | Tefertiller |
| 4,690,501 | A | 9/1987 | Zimmerman et al. |
| 6,689,463 | B2 | 2/2004 | Chou et al. |
| 6,775,451 | B1 | 8/2004 | Botelho et al. |
| 6,849,333 | B2 | 2/2005 | Schissel et al. |
| 6,853,788 | B2 | 2/2005 | Oshio et al. |
| 8,093,322 | B2 | 1/2012 | Hancock, Jr. et al. |
| 8,114,520 | B2 | 2/2012 | Wakayama et al. |
| 8,731,366 | B2 | 5/2014 | Wu et al. |
| 9,695,331 | B2 | 7/2017 | Horgan et al. |
| 9,810,838 | B2 | 11/2017 | Chen et al. |
| 2007/0049671 | A1 | 3/2007 | Finch et al. |
| 2012/0016050 | A1 | 1/2012 | Leon et al. |
| 2018/0127593 | A1 | 5/2018 | Chen et al. |

FOREIGN PATENT DOCUMENTS

| | | | |
|---|---|---|---|
| JP | 06044318 | B2 | 6/1994 |
| JP | 2012107140 | A * | 6/2012 |
| JP | 2013088455 | A * | 5/2013 |
| JP | 2014118319 | A | 6/2014 |
| KR | 483053 | B1 | 4/2005 |
| KR | 1519099 | B1 | 5/2015 |
| WO | 2008003190 | A1 | 1/2008 |
| WO | 2008003191 | A1 | 1/2008 |

OTHER PUBLICATIONS

Machine translation of JP-2012107140-A (Year: 2012).*
Machine translation of JP-2013088455-A (Year: 2013).*
Netherlands Application No. 2020470 Search Report and Written Opinion dated Oct. 31, 2018; 10 Pages; European Patent Office.

* cited by examiner

*Primary Examiner* — Wenwen Cai
(74) *Attorney, Agent, or Firm* — Kevin L. Bray (57) ABSTRACT

A method for making oligomers is described. The method includes reacting a polyol with a precursor having mixed functionality. The precursor includes a curable functional group and an isocyanate group capable of reacting with an alcohol group of the polyol. The precursor reacts with the alcohol group of the polyol to form a urethane linkage and to add a covalently bonded curable functional group to the polyol. The oligomers can be included in coating compositions for optical fiber and lead to coatings having improved tear strength.

15 Claims, 3 Drawing Sheets

SYNTHESIS OF OLIGOMER FOR OPTICAL FIBER COATING

This application claims the benefit of priority to Dutch Patent Application No. 2020470, filed on Feb. 21, 2018, which claims the benefit of priority to U.S. Provisional Application Ser. No. 62/619,976 filed on Jan. 22, 2018, the content of which is relied upon and incorporated herein by reference in its entirety.

FIELD

This disclosure pertains to an oligomer, methods for making the oligomer, coating compositions that include the oligomer, and cured products of coating compositions that include the oligomer. More particularly, this disclosure pertains to an oligomer for use in coating compositions of optical fibers.

BACKGROUND

The transmittance of light through an optical fiber is highly dependent on the properties of the coatings applied to the fiber. The coatings typically include a primary coating and a secondary coating, where the secondary coating surrounds the primary coating and the primary coating contacts the glass waveguide (core+cladding) portion of the fiber. The secondary coating is a harder material (higher Young's modulus) than the primary coating and is designed to protect the glass waveguide from damage caused by abrasion or external forces that arise during processing and handling of the fiber. The primary coating is a softer material (low Young's modulus) and is designed to buffer or dissipates stresses that result from forces applied to the outer surface of the secondary coating. Dissipation of stresses within the primary layer attenuates the stress and minimizes the stress that reaches the glass waveguide. The primary coating is especially important in dissipating stresses that arise when the fiber is bent. The bending stresses transmitted to the glass waveguide on the fiber need to be minimized because bending stresses create local perturbations in the refractive index profile of the glass waveguide. The local refractive index perturbations lead to intensity losses for the light transmitted through the waveguide. By dissipating stresses, the primary coating minimizes bend-induced intensity losses.

To minimize bending losses, it is desirable to develop primary coating materials with increasingly lower Young's moduli. Primary coating materials with a Young's modulus below 1 MPa are preferred. As the Young's modulus of the primary coating is reduced, however, the primary coating is more susceptible to damage in the fiber manufacturing process or during fiber installation or deployment. Thermal and mechanical stresses that arise during the fiber coating process or during post-manufacture fiber handling and configuration processes (e.g. stripping, cabling and connecting operations) may lead to the formation of defects in the primary coating. The defect formation in the primary coating becomes more problematic as the Young's modulus of the primary coating material decreases. There is a need for a primary coating material that has a low Young's modulus and yet is resistant to stress-induced defect formation during fiber manufacture and handling.

Primary coatings with low Young's modulus and high tear strength have been described in U.S. Pat. No. 9,810,838, the disclosure of which is incorporated herein. The coatings are formed from a radiation-curable coating composition that includes monomers, oligomers, photoinitiator(s), and various additives. The modulus and other mechanical properties of primary coatings are strongly influenced by the oligomer. Current methods for making suitable oligomers, however, are slow and expensive. There is a need for new methods for synthesizing oligomers for optical fiber coating compositions.

SUMMARY

The present disclosure provides methods for making oligomers. The oligomers are suitable for use in coating compositions and provide control of mechanical properties of coatings made from the coating compositions. Coatings made from coating compositions that include the oligomers feature a Young's modulus ≤1.0 MPa, a tensile strength ≥0.25 MPa, a tear strength ≥20 J/m$^2$, and/or a $T_g$≤−35° C.

The oligomers include compounds with urethane linkages and are made through a reaction of a polyol and a precursor with mixed functionality. The precursor includes an isocyanate group and a curable functional group. In one aspect, the curable functional group is an acrylate group or a methacrylate group. In some aspects, the oligomer includes two or more urethane compounds and/or a supplemental compound having two or more functional groups.

The present disclosure extends to:
A method for making an oligomer, comprising:
reacting a first polyol with a first precursor to form a first urethane compound, the first polyol including two or more OH groups and a repeating alkoxylene group, the first precursor including an isocyanate group and a curable functional group The present disclosure extends to:
An oligomer formed from a reaction of a first polyol with a first precursor, the first polyol including two or more OH groups and a repeating alkoxylene group, the first precursor including an isocyanate group and a curable functional group.

The present disclosure extends to:
A coating composition comprising:
an oligomer, the oligomer comprising a first urethane compound, the first urethane compound formed from a reaction of a first polyol with a first precursor, the first polyol including two or more OH groups and a repeating alkoxylene group, the first precursor including an isocyanate group and a curable functional group.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings are illustrative of selected aspects of the present description, and together with the specification serve to explain principles and operation of methods, products, and compositions embraced by the present description. Features shown in the drawing are illustrative of selected embodiments of the present description and are not necessarily depicted in proper scale.

BRIEF DESCRIPTION OF THE DRAWINGS

While the specification concludes with claims particularly pointing out and distinctly claiming the subject matter of the written description, it is believed that the specification will be better understood from the following written description when taken in conjunction with the accompanying drawings, wherein:

The embodiments set forth in the drawings are illustrative in nature and not intended to be limiting of the scope of the detailed description or claims. Whenever possible, the same reference numeral will be used throughout the drawings to refer to the same or like feature.

DETAILED DESCRIPTION

The present disclosure is provided as an enabling teaching and can be understood more readily by reference to the following description, drawings, examples, and claims. To this end, those skilled in the relevant art will recognize and appreciate that many changes can be made to the various aspects of the embodiments described herein, while still obtaining the beneficial results. It will also be apparent that some of the desired benefits of the present embodiments can be obtained by selecting some of the features without utilizing other features. Accordingly, those who work in the art will recognize that many modifications and adaptations are possible and can even be desirable in certain circumstances and are a part of the present disclosure. Therefore, it is to be understood that this disclosure is not limited to the specific compositions, articles, devices, and methods disclosed unless otherwise specified. It is also to be understood that the terminology used herein is for the purpose of describing particular aspects only and is not intended to be limiting.

In this specification and in the claims which follow, reference will be made to a number of terms which shall be defined to have the following meanings:

"Include," "includes," or like terms means encompassing but not limited to, that is, inclusive and not exclusive.

The term "about" references all terms in the range unless otherwise stated. For example, about 1, 2, or 3 is equivalent to about 1, about 2, or about 3, and further comprises from about 1-3, from about 1-2, and from about 2-3. Specific and preferred values disclosed for compositions, components, ingredients, additives, and like aspects, and ranges thereof, are for illustration only; they do not exclude other defined values or other values within defined ranges. The compositions and methods of the disclosure include those having any value or any combination of the values, specific values, more specific values, and preferred values described herein.

The indefinite article "a" or "an" and its corresponding definite article "the" as used herein means at least one, or one or more, unless specified otherwise.

The coatings described herein are formed from curable coating compositions. Curable coating compositions include one or more curable components. Curable components include curable monomers and curable oligomers. As used herein, the term "curable" is intended to mean that the component, when exposed to a suitable source of curing energy, includes one or more curable functional groups capable of forming covalent bonds that participate in linking the component to itself or to other components of the coating composition. The product obtained by curing a curable coating composition is referred to herein as the cured product of the composition. In one embodiment, the cured product is employed as a coating material on an optical fiber. The curing process is induced by energy. Forms of energy include radiation or thermal energy. A radiation-curable component is a component that can be induced to undergo a curing reaction when exposed to radiation of a suitable wavelength at a suitable intensity for a sufficient period of time. The radiation curing reaction may occur in the presence of a photoinitiator. A radiation-curable component may also be thermally curable. Similarly, a thermally-curable component is a component that can be induced to undergo a curing reaction when exposed to thermal energy of sufficient intensity for a sufficient period of time. A thermally curable component may also be radiation curable.

A curable component includes one or more curable functional groups. A curable component with only one curable functional group is referred to herein as a monofunctional curable component. A curable component having two or more curable functional groups is referred to herein as a multifunctional curable component or a polyfunctional curable component. Multifunctional curable components include two or more functional groups capable of forming covalent bonds during the curing process and can introduce crosslinks into the polymeric network formed during the curing process. Multifunctional curable components may also be referred to herein as "crosslinkers" or "curable crosslinkers". Examples of functional groups that participate in covalent bond formation during the curing process are identified hereinafter.

In the description that follows, various components of coating compositions will be discussed and the amounts of particular components in the coating composition will be specified in terms of weight percent (wt %) or parts per hundred (pph). The components of the coating composition include base components and additives. The concentration of base components will be expressed in terms of wt % and the concentration of additives will be expressed in terms of pph.

As used herein, the weight percent of a particular base component refers to the amount of the component present in the coating composition on a basis that excludes additives. The additive-free coating composition includes only base components and is referred to herein as a base composition or base coating composition. Any curable component(s) and polymerization initiator(s) present in a coating composition are regarded individually as base components and collectively as a base composition. In one aspect, the base composition includes a radiation-curable component and a photoinitiator. The radiation-curable component may be a radiation-curable crosslinker or a radiation-curable diluent. The radiation-curable component may be a monomer or an oligomer. In different aspects, the base composition includes one or more radiation-curable components and one or more polymerization initiators. The collective amount of base components in a coating composition is regarded herein as equaling 100 weight percent.

Additives are optional and may include one or more of a UV absorber, an adhesion promoter, an antioxidant, a catalyst, a carrier or surfactant, a tackifier, a stabilizer, and an optical brightener. Representative additives are described in more detail hereinbelow. The amount of additives introduced into the coating composition is expressed herein in parts per hundred (pph) relative to the base composition. For example, if 1 g of a particular additive is added to 100 g of base composition, the concentration of additive is expressed herein as 1 pph.

The term "molecular weight" when applied to polyols means number average molecular weight.

Reference will now be made in detail to illustrative embodiments of the present description.

The present disclosure provides methods for making oligomers. The oligomers are suitable for use in coating compositions and assist control of mechanical properties of coatings made from the coating compositions. The oligomers are multifunctional compounds and can be included as multifunctional components in coating compositions. The oligomers include one or more compounds with urethane linkages. In one aspect, the oligomers are prepared by a reaction of a polyol and a precursor having mixed functionality. In another aspect the oligomers are prepared by a reaction of a polyol, an alcohol, and a precursor. The precursor includes a curable functional group and a functional group capable of reacting with a polyol or alcohol.

A polyol is a compound having two or more reactive OH groups and a repeating alkoxylene group. Preferably at least one of the reactive OH groups is a terminal OH group. Preferred polyols include diols with two terminal reactive OH groups. Such polyols can be represented by the formula:

$$H\text{—}O\text{—}[R_1\text{—}O]_n H \tag{1}$$

where $R_1$ is an organic group, $\text{—}O\text{—}R_1\text{—}$ is a repeating alkoxylene group, and n is an integer. Preferably, n is greater than 20, or greater than 25, or greater than 50, or greater than 75, or greater than 100, or greater than 125, or greater than 150, or in the range from 25-500, or in the range from 40-450, or in the range from 50-400. $R_1$ is preferably a linear or branched alkylene group, such as methylene, ethylene, propylene, or butylene. The molecular weight of the polyol is greater than 1000 g/mol, or greater than 3000 g/mol, or greater than 5000 g/mol, or greater than 7500 g/mol, or greater than 10000 g/mol, or in the range from 1000 g/mol-25000 g/mol, or in the range from 3000 g/mol-20000 g/mol, or in the range from 5000 g/mol-20000 g/mol, or in the range from 6000 g/mol-15000 g/mol, or in the range from 8000 g/mol-15000 g/mol.

The precursor includes an isocyanate group and a curable functional group. Preferably, one of the isocyanate group and curable functional group is a terminal group. More preferably, both the isocyanate group and curable functional group are terminal groups. Preferably, the precursor is difunctional and includes one curable functional group and one isocyanate group. A representative precursor with a terminal isocyanate group and a terminal curable functional group is $$O\text{=}C\text{=}N\text{—}R_2\text{—}CFG \tag{2}$$

where CFG represents a curable functional group and $R_2$ is an organic group. The curable functional group CFG is preferably an ethylenically unsaturated group. Preferred curable functional groups include acrylates and methacrylates. $R_2$ is a linear or branched organic group. Representative groups $R_2$ include groups with alklyene linkages (e.g. methylene, ethylene, propylene, butylene), ether linkages, ester linkages, amine linkages, and amide linkages. $R_2$ may include cyclic groups, preferably non-aromatic cyclic groups. The precursor preferably has a molecular weight less than 500 g/mol, or less than 400 g/mol, or less than 300 g/mol, or less than 200 g/mol, or less than 100 g/mol, or in the range from 50 g/mol-500 g/mol, or in the range from 75 g/mol-400 g/mol, or in the range from 100 g/mol-300 g/mol.

The polyol and precursor react to form an oligomer according to the following reaction scheme:

(3)

The product of a polyol and the precursor is a curable urethane compound. Reaction (3) illustrates a reaction of a precursor with a polyol having two terminal OH groups. Analogous reactions occur for polyols having three or more OH groups as well as for polyols having OH groups in positions other than terminal positions. Reactions analogous to reaction (3) also occur for alcohols (diols, triols, tetraols, etc.) other than polyols. Alcohols lacking a repeating alkoxylene group, for example, undergo a reaction with a precursor analogous to reaction (3) to form a curable urethane compound. Such alcohols include alcohols having the formula $R_1(OH)_n$, where $R_1$ is an organic group as described above.

In a representative illustration, the polyol is polypropylene glycol (PPG), the precursor is 2-isocyanatoethylacrylate (IEA) and the reaction to form an oligomer is (4)

where BHT is butylated hydroxy toluene (an antioxidant) and DBTDL is dibutyl tin dilaurate (a catalyst).

In one aspect, the process for making an oligomer includes a reaction of a polyol with two or more precursors. In another aspect, the process for making an oligomer includes a reaction of a precursor with two or more polyols. In a further aspect, the process for making an oligomer includes a reaction of two or more polyols with two or more precursors. When two or more precursors are reacted with a diol or polyol, or two or more polyols are reacted with a precursor, or two or more diols are reacted with a precursor, or a polyol and diol are reacted with a precursor, the product is an oligomer that includes two or more urethane compounds.

In one aspect, the process for making an oligomer includes a reaction of a polyol and a diol with two or more precursors. In another aspect, the process for making an oligomer includes a reaction of a precursor with two or more polyols and a diol. In still another aspect, the process for making an oligomer includes a reaction of two or more polyols and a diol with two or more precursors. In a further aspect, the process for making an oligomer includes a reaction of a precursor with two or more diols and a polyol. In still another aspect, the process for making an oligomer includes a reaction of two or more diols and a polyol with two or more precursors. When two or more precursors are reacted with two or more polyols or two or more diols or a polyol and a diol, the product is an oligomer that includes two or more urethane compounds.

In one aspect of processes that include a reaction of one or more precursors with one or more diols and one or more polyols, the one or more diols and one or more polyols include a diol and a polyol that differ significantly in molecular weight. Each diol and polyol reacts with a precursor according to reactions described herein (including, for example, reaction (3)) to produce a urethane compound. While not wishing to be bound by theory, it is believed that an oligomer that includes two or more urethane compounds that differ significantly in molecular weight may lead to higher tear strengths for coatings made as cured products of coating compositions that include such oligomers In some aspects of reactions of one or more precursors with a diol and a polyol, the molecular weight of the polyol is greater than the molecular weight of the diol by at least 500 g/mol, or at least 1000 g/mol, or at least 2500 g/mol, or at least 5000 g/mol, or at least 7500 g/mol, or at least 10000 g/mol. Processes include reactions of a precursor with a combination of a diol having a molecular weight less than 2000 g/mol and a polyol having a molecular weight greater than 3000 g/mol, or a combination of a diol having a molecular weight less than 2000 g/mol and a polyol having a molecular weight greater than 5000 g/mol, or a combination of a diol having a molecular weight less than 2000 g/mol and a polyol having a molecular weight greater than 7500 g/mol, or a combination of a diol having a molecular weight less than 2000 g/mol and a polyol having a molecular weight greater than 10000 g/mol, or a combination of a diol having a molecular weight less than 1000 g/mol and a polyol having a molecular weight greater than 3000 g/mol, or a combination of a diol having a molecular weight less than 1000 g/mol and a polyol having a molecular weight greater than 3000 g/mol, or a combination of a diol having a molecular weight less than 1000 g/mol and a polyol having a molecular weight greater than 7500 g/mol, or a combination of a diol having a molecular weight less than 1000 g/mol and a polyol having a molecular weight greater than 10000 g/mol, or a combination of a diol having a molecular weight less than 500 g/mol and a polyol having a molecular weight greater than 3000 g/mol, or a combination of a diol having a molecular weight less than 500 g/mol and a polyol having a molecular weight greater than 3000 g/mol, or a combination of a diol having a molecular weight less than 500 g/mol and a polyol having a molecular weight greater than 7500 g/mol, or a combination of a diol having a molecular weight less than 500 g/mol and a polyol having a molecular weight greater than 10000 g/mol.

In certain processes that include reactions of a precursor with a polyol and a diol, the molecular weight of the polyol is greater than the molecular weight of the diol and the ratio of the molar amount of the polyol to the molar amount of the diol is greater than 10:1, or greater than 20:1, or greater than 50:1, or greater than 75:1, or greater than 100:1. When the process includes two or more polyols and/or two or more diols, the foregoing molar ratios apply to the combined molar ratio of all polyols relative to the combined molar ratio of all diols, or to the molar ratio of the polyol having the greatest molecular weight relative to the molecular weight of the diol having the lowest molecular weight.

In oligomers that include two or more urethane compounds, the amount of the urethane compound with the lowest molecular weight is at least 1.0 wt % in the oligomer, or at least 1.5 wt % in the oligomer, or at least 2.0 wt % in the oligomer, or at least 2.5 wt % in the oligomer, or at least 3.0 wt % in the oligomer, or at least 3.5 wt % in the oligomer, or at least 4.0 wt % in the oligomer, or at least 4.5 wt % in the oligomer, or at least 5.0 wt % in the oligomer, or at least 7.0 wt % in the oligomer, or at least 9.0 wt % in the oligomer, or in the range from 1.0 wt %-10.0 wt % in the oligomer, or in the range from 2.0 wt % to 9.0 wt % in the oligomer, or in the range from 3.0 wt % to 8.0 wt % in the oligomer, or in the range from 3.5 wt % to 7.0 wt % in the oligomer, or in the range from 2.5 wt % to 6.0 wt % in the oligomer, or in the range from 3.0 wt % to 5.5 wt % in the oligomer, or in the range from 3.5 wt % to 5.0 wt % in the oligomer.

In some aspects, the oligomer is prepared by a reaction of a precursor with two or more polyols, where the molecular weight of one polyol is greater than the molecular weight of another polyol by at least 500 g/mol, or at least 1000 g/mol, or at least 2500 g/mol, or at least 5000 g/mol, or at least 7500 g/mol, or at least 10000 g/mol. Processes include reactions of a precursor with a combination of a polyol having a molecular weight less than 9000 g/mol and a polyol having a molecular weight greater than 11000 g/mol, or a combination of a polyol having a molecular weight less than 7000 g/mol and a polyol having a molecular weight greater than 8000 g/mol, or a combination of a polyol having a molecular weight less than 6500 g/mol and a polyol having a molecular weight greater than 8500 g/mol, or a combination of a polyol having a molecular weight less than 6000 g/mol and a polyol having a molecular weight greater than 9000 g/mol, or a combination of a polyol having a molecular weight less than 5500 g/mol and a polyol having a molecular weight greater than 10000 g/mol, or a combination of a polyol having a molecular weight less than 5000 g/mol and a polyol having a molecular weight greater than 11000 g/mol, or a combination of a polyol having a molecular weight less than 4500 g/mol and a polyol having a molecular weight greater than 12000 g/mol.

In other aspects, an oligomer is prepared by reaction of a precursor with a polyol in the presence of a supplemental compound having two or more curable functional groups. The supplemental compound does not react with the precursor or polyol (or diol, which is optionally present), but is included as a constituent of the oligomer. Alternatively, the supplemental compound can be added to the product formed by reaction of the precursor with the polyol (or diol, which is optionally present). In one aspect, the supplemental compound is difunctional with two curable functional groups, preferably two terminal curable functional groups, represented by the formula:

CFG-R₃-CFG                   (5)

where CFG is a curable functional group and $R_3$ is an organic group. The curable functional group CFG is preferably an ethylenically unsaturated group. Preferred curable functional groups include acrylates and methacrylates. The curable functional groups may be the same or different. $R_3$ is a linear or branched organic group. Representative groups $R_3$ include groups with alklyene linkages (e.g. methylene, ethylene, propylene, butylene), ether linkages, ester linkages, amine linkages, and amide linkages. $R_3$ may include cyclic groups, preferably non-aromatic cyclic groups. The supplemental compound preferably has a molecular weight less than 500 g/mol, or less than 400 g/mol, or less than 300 g/mol, or less than 200 g/mol, or less than 100 g/mol, or in the range from 50 g/mol-500 g/mol, or in the range from 75 g/mol-400 g/mol, or in the range from 100 g/mol-300 g/mol. Representative supplemental compounds include diacrylates such as alkoxylated forms of bisphenol A diacrylates (e.g. alkoxylated (n) bisphenol A diacrylates, including ethoxylated (n) bisphenol A diacrylates, where n is an integer in the range from 10-50, or 20-40) and tricyclodecanediol diacrylates (e.g. EBECRYL 130).

In oligomers that include a supplemental compound, the amount of the supplemental compound is at least 1.0 wt % in the oligomer, or at least 1.5 wt % in the oligomer, or at least 2.0 wt % in the oligomer, or at least 2.5 wt % in the oligomer, or at least 3.0 wt % in the oligomer, or at least 3.5 wt % in the oligomer, or at least 4.0 wt % in the oligomer, or at least 4.5 wt % in the oligomer, or at least 5.0 wt % in the oligomer, or at least 7.0 wt % in the oligomer, or at least 9.0 wt % in the oligomer, or in the range from 1.0 wt %-10.0 wt % in the oligomer, or in the range from 2.0 wt % to 9.0 wt % in the oligomer, or in the range from 3.0 wt % to 8.0 wt % in the oligomer, or in the range from 3.5 wt % to 7.0 wt % in the oligomer, or in the range from 2.5 wt % to 6.0 wt % in the oligomer, or in the range from 3.0 wt % to 5.5 wt % in the oligomer, or in the range from 3.5 wt % to 5.0 wt % in the oligomer.

In the conventional reaction scheme used to form curable urethane oligomers, a diisocyanate compound is reacted with a polyol to form a polyurethane. An excess of diisocyanate is used to provide terminal isocyanate groups, which are then reacted with a hydroxy compound that contains a curable functional group to obtain a curable oligomer.

The conventional reaction scheme for forming curable urethane oligomers can be illustrated through the reaction of a diisocyanate compound (e.g. 4,4'-methylene bis(cyclohexyl isocyanate), which is also referred to herein as H12MDI), a polyol (e.g. polypropylene glycol with a molecular weight of ~4000 g/mol, which is also referred to herein as PPG4000), a hydroxy acrylate compound (e.g. 2-hydroxyethyl acrylate, which is also referred to herein as HEA). The formulas for H12MDI, PPG4000, and HEA are given below:

(6)

H12MDI

PPG4000

HEA

Reaction of H12MDI and PPG4000 occurs under conditions of excess H12MDI to produce H12MDI~PPG4000~H12MDI         (9)

where "~" denotes a urethane linkage formed by the reaction of a terminal isocyanate group of H12MDI with a terminal alcohol group of PPG4000 and ~H12MDI, ~H12MDI~, and ~PPG4000~ refer to residues of H12MDI and PPG4000 remaining after the reaction. The terminal isocyanate groups of H12MDI further react with a 2-hydroxyethyl acrylate to provide a curable urethane oligomer HEA~H12MDI~PPG4000~H12MDI~HEA         (10)

where, as above, "~" denotes a urethane linkage and ~HEA refers to the residue of HEA remaining after reaction to form the urethane linkage.

The conventional reaction scheme is a multistep process that requires long process times. The process begins with a reaction of a diisocyanate compound with a polyol. Excess diisocyanate is used to provide terminal isocyanate groups that react in a second reaction with a hydroxy acrylate compound to convert the terminal isocyanate groups to terminal acrylate groups. Use of the precursor with mixed isocyanate-acrylate functionality as described herein provides direct conversion of OH groups of the polyol to acrylate groups. Fewer process steps and shorter reaction times result.

The conventional reaction scheme is further disadvantageous because it can lead to a distribution of products. As noted, an isocyanate-terminated compound (e.g. (10)) is produced as an intermediate product. An isocyanate-terminated intermediate is needed to enable reaction with a hydroxy acrylate compound to provide terminal acrylate groups. The presence of the intermediate compound, however, also allows for further reaction of terminal isocyanate groups with the polyol to provide a distribution of reaction products. For example, reaction of compound (9) with PPG 4000 produces compounds such as H12MDI~PPG4000~H12MDI~PPG4000         (11)

which can further react with excess H12MDI to produce

H12MDI~PPG4000~H12MDI~PPG4000~H12MDI         (12)

and upon further reaction with HEA yields

HEA~H12MDI~PPG4000~H12MDI~PPG4000~
H12MDI~HEA         (13)

In principle, curable urethane oligomers with a distribution in the number of repeat units of the type ~(H12MDI~PPG4000)~ are produced in the conventional reaction scheme. The different products are difficult to separate and the presence of multiple products alters the viscosity of the oligomer and may affect the properties of coatings cured from coating compositions that include the oligomer. The reaction scheme described herein, in contrast, produces a more uniform reaction product.

Coatings are cured products of coating compositions. The coating compositions include a curable oligomer and an initiator. The coating composition optionally includes a curable monomer and/or one or more additives. The curable oligomer is an oligomer containing one or more urethane compounds as described herein. In various aspects, the curable oligomer is present in the curable coating composition in an amount greater than 40 wt %, or greater than 50 wt %, or greater than 70 wt %, or greater than 90 wt %, or in the range from 30 wt %-99 wt %, or in the range from 40 wt %-97 wt %, or in the range from 50 wt %-95 wt %, or in the range from 60 wt %-90 wt %. In some embodiments, the curable oligomer is the only curable compound in the coating composition. The initiator is preferably a photoinitiator. The coating composition may include one or more curable monomers, one or more curable oligomers, and/or one or more photoinitiators.

The optional curable monomer component of the curable coating composition is selected to be compatible with the oligomer, to provide a lower viscosity formulation (e.g. monomer diluent), and/or to influence the physical or chemical properties of the coating. The coating composition includes a single monomer or a combination of monomers. The coating composition includes one or more monofunctional monomers, one or more multifunctional monomers or a combination thereof. The monomers include ethylenically-unsaturated compounds, ethoxylated acrylates, ethoxylated alkylphenol monoacrylates, propylene oxide acrylates, n-propylene oxide acrylates, isopropylene oxide acrylates, monofunctional acrylates, monofunctional aliphatic epoxy acrylates, multifunctional acrylates, multifunctional aliphatic epoxy acrylates, and combinations thereof.

Representative radiation-curable ethylenically unsaturated monomers include alkoxylated monomers with one or more acrylate or methacrylate groups. An alkoxylated monomer is one that includes one or more alkoxylene groups, where an alkoxylene group has the form —O—R— and R is a linear or branched hydrocarbon. Examples of alkoxylene groups include ethoxylene (—O—CH$_2$—CH$_2$—), n-propoxylene (—O—CH$_2$—CH$_2$—CH$_2$—), isopropoxylene (—O—CH$_2$—CH(CH$_3$)—), etc. As used herein, the degree of alkoxylation refers to the number of alkoxylene groups in the monomer. In one embodiment, the alkoxylene groups are bonded consecutively in the monomer.

In embodiments, the optional curable monomer component of the coating composition includes one or more monofunctional (meth)acrylate compounds (mono(meth)acrylate compounds). As used herein, the term "(meth)acrylate" means acrylate or methacrylate. A monofunctional acrylate compound has the general formula R$_2$—R$_1$—O—(R$_3$—O)$_q$—COCH=CH$_2$, where R$_1$, R$_2$ and R$_3$ are aliphatic, aromatic, or a mixture of both, and q=1 to 10, or R$_1$—O—(R$_2$—O)$_q$—COCH=CH$_2$, where R$_1$ and R$_2$ are aliphatic or aromatic, and q=1 to 10. Representative examples include ethylenically unsaturated monofunctional monomers such as lauryl acrylate (e.g., SR335 available from Sartomer Company, Inc., AGEFLEX FA12 available from BASF, and PHOTOMER 4812 available from IGM Resins), ethoxylated nonylphenol acrylate (e.g., M164 available from Miwon Specialty Chemical Company Ltd., SR504 available from Sartomer Company, Inc. and PHOTOMER 4066 available from IGM Resins), caprolactone acrylate (e.g., SR495 available from Sartomer Company, Inc., and TONE M-100 available from Dow Chemical), phenoxyethyl acrylate (e.g., SR339 available from Sartomer Company, Inc., AGEFLEX PEA available from BASF, and PHOTOMER 4035 available from IGM Resins), isooctyl acrylate (e.g., SR440 available from Sartomer Company, Inc. and AGEFLEX FA8 available from BASF), tridecyl acrylate (e.g., SR489 available from Sartomer Company, Inc.), isobornyl acrylate (e.g., SR506 available from Sartomer Company, Inc. and AGEFLEX IBOA available from CPS Chemical Co.), tetrahydrofurfuryl acrylate (e.g., SR285 available from Sartomer Company, Inc.), stearyl acrylate (e.g., SR257 available from Sartomer Company, Inc.), isodecyl acrylate (e.g., SR395 available from Sartomer Company, Inc. and AGEFLEX FA10 available from BASF), 2-(2-ethoxyethoxy)ethyl acrylate (e.g., SR256 available from Sartomer Company, Inc.), epoxy acrylate (e.g., CN120, available from Sartomer Company, and EBECRYL 3201 and 3604, available from Cytec Industries Inc.), laurylox-yglycidyl acrylate (e.g., CN130 available from Sartomer Company) and phenoxyglycidyl acrylate (e.g., CN131 available from Sartomer Company) and combinations thereof.

In some embodiments, the optional curable monomer component of the coating composition includes a multifunctional (meth)acrylate. Multifunctional (meth)acrylates are (meth)acrylates having two or more curable (meth)acrylate functional groups per molecule (di(meth)acrylates), or three or more curable (meth)acrylate functional groups per molecule (tri(meth)acrylates). Examples of multifunctional (meth)acrylates include dipentaerythritol monohydroxy pentaacrylate (e.g., PHOTOMER 4399 available from IGM Resins); methylolpropane polyacrylates with and without alkoxylation such as trimethylolpropane triacrylate, ditrimethylolpropane tetraacrylate (e.g., PHOTOMER 4355, IGM Resins); alkoxylated glyceryl triacrylates such as propoxylated glyceryl triacrylate with propoxylation being 3 or greater (e.g., PHOTOMER 4096, IGM Resins); and erythritol polyacrylates with and without alkoxylation, such as pentaerythritol tetraacrylate (e.g., SR295, available from Sartomer Company, Inc. (Westchester, Pa.)), ethoxylated pentaerythritol tetraacrylate (e.g., SR494, Sartomer Company, Inc.), dipentaerythritol pentaacrylate (e.g., PHOTOMER 4399, IGM Resins, and SR399, Sartomer Company, Inc.), tripropyleneglycol di(meth)acrylate, propoxylated hexanediol di(meth)acrylate, tetrapropyleneglycol di(meth)acrylate, pentapropyleneglycol di(meth) acrylate. In an embodiment, a multifunctional (meth)acrylate monomer is present in the curable coating composition at a concentration of from 0.05-15 wt %, or from 0.1-10 wt %. In other embodiments, the curable coating composition lacks a multifunctional (meth)acrylate monomer.

In an aspect, the coating composition includes a combined amount of one or more monofunctional monomers in an amount less than 30 wt %, or less than 20 wt %, or less than 10 wt %, or less than 5.0 wt %, or in the range from 1-30 wt %, or in the range from 1-20 wt %, or in the range from 1-10 wt %, or in the range from 5-30 wt %, or in the range from 5-20 wt %, or in the range from 5-10 wt %. In other aspects, the coating composition lacks a monofunctional (meth) acrylate monomer.

In an embodiment, the optional curable monomer component of the coating compositions includes an N-vinyl amide such as an N-vinyl lactam, or N-vinyl pyrrolidinone, or N-vinyl caprolactam (NVC), where the N-vinyl amide monomer is present in the coating composition at a concentration from 0.1-40 wt %, or from 1.0-10 wt %.

In some embodiments, the coating composition includes an N-vinyl amide monomer at a concentration of 0.1 to 40 wt % or 2.0 to 10 wt % in combination with an oligomer in accordance with the present disclosure in an amount in the range from 50 to 98 wt %, or in the range from 60 to 96 wt % or in the range from 70 to 94 wt %.

In some embodiments, the coating composition includes one or more monofunctional (meth)acrylate monomers in an amount of from about 5 to 95 wt %; an N-vinyl amide monomer in an amount of from about 0.1 to 40 wt %; and an oligomer in accordance with the present disclosure in an amount of from about 5 to 95 wt %.

In some embodiments, the coating composition includes one or more monofunctional (meth)acrylate monomers in an amount of from about 40 to 65% by weight; an N-vinyl amide monomer in an amount of from about 2 to 10% by weight; and an oligomer in accordance with the present disclosure in an amount of from about 35 to 60% by weight.

The curable coating composition further includes an initiator, preferably a photoinitiator. The photoinitiator facilitates initiation of the curing reaction and formation of a cured product from the coating composition. In one embodiment, the curing reaction is a polymerization reaction and the photoinitiator enhances the rate of the polymerization reaction. Photoinitiators include ketonic photoinitiating additives and/or phosphine oxide additives. The photoinitiator is present in an amount sufficient to enable rapid radiation curing. The concentration of photoinitiator in the coating composition is greater than 0.1 wt %, or greater than 0.25 wt %, or greater than 0.50 wt %, or greater than 0.75 wt %, or greater than 1.0 wt %, or in the range from 0.1 wt %-10.0 wt %, or in the range from 0.1 wt %-5.0 wt %, or in the range from 0.1 wt %-2.5 wt %, or in the range from 0.25 wt %-5.0 wt %, or in the range from 0.25 wt %-2.5 wt %.

The wavelength of curing radiation is infrared, visible, or ultraviolet. Representative wavelengths include wavelengths in the range from 250 nm-1000 nm, or in the range from 250 nm-700 nm, or in the range from 250 nm-450 nm, or in the range from 275 nm-425 nm, or in the range from 300 nm-400 nm, or in the range from 320 nm-390 nm, or in the range from 330 nm-380 nm, or in the range from 340 nm-370 nm. Curing can be accomplished with light sources that include a lamp source (e.g. Hg lamp), an LED source (e.g. a UVLED, visible LED, or infrared LED), or a laser source. Curing can be accomplished with a lamp source (e.g. Hg lamp) or LED source (e.g. a UVLED or visible LED).

In a continuous optical fiber manufacturing process, a glass fiber is drawn from a heated preform and sized to a target diameter (typically 125 mm). The glass fiber is then cooled and directed to a coating system that applies a liquid primary coating composition to the glass fiber. Two process options are viable after application of the liquid primary coating composition to the glass fiber. In one process option (wet-on-dry process), the liquid primary coating composition is cured to form a solidified primary coating, the liquid secondary coating composition is applied to the cured primary coating, and the liquid secondary coating composition is cured to form a solidified secondary coating. In a second process option (wet-on-wet process), the liquid secondary coating composition is applied to the liquid primary coating composition, and both liquid coating compositions are cured simultaneously to provide solidified primary and secondary coatings. After the fiber exits the coating system, the fiber is collected and stored at room temperature. Collection of the fiber typically entails winding the fiber on a spool and storing the spool.

In some processes, the coating system further applies a tertiary coating composition to the secondary coating and cures the tertiary coating composition to form a solidified tertiary coating. Typically, the tertiary coating is an ink layer used to mark the fiber for identification purposes and has a composition that includes a pigment and is otherwise similar to the secondary coating. The tertiary coating is applied to the secondary coating and cured. The secondary coating has typically been cured at the time of application of the tertiary coating. The primary, secondary, and tertiary coating compositions can be applied and cured in a common continuous manufacturing process. Alternatively, the primary and secondary coating compositions are applied and cured in a common continuous manufacturing process, the coated fiber is collected, and the tertiary coating composition is applied and cured in a separate offline process to form the tertiary coating.

Each of the primary, secondary, and tertiary compositions are curable with any of the wavelengths and any of the light sources referred to above. The same wavelength or source can be used to cure each of the primary, secondary, and tertiary compositions, or different wavelengths and/or different sources can be used to cure the primary, secondary, and tertiary compositions. Curing of the primary, secondary, and tertiary compositions can be accomplished with a single wavelength or a combination of two or more wavelengths.

Representative photoinitiators include 1-hydroxycyclohexylphenyl ketone (e.g., IRGACURE 184 available from BASF)); bis(2,6-dimethoxybenzoyl)-2,4,4-trimethylpentylphosphine oxide (e.g., commercial blends IRGACURE 1800, 1850, and 1700 available from BASF); 2,2-dimethoxy-2-phenylacetophenone (e.g., IRGACURE 651, available from BASF); bis(2,4,6-trimethylbenzoyl)-phenylphosphine oxide (IRGACURE 819); (2,4,6-trimethylbenzoyl) diphenyl phosphine oxide (LUCIRIN TPO, available from BASF (Munich, Germany)); ethoxy(2,4,6-trimethylbenzoyl)-phenylphosphine oxide (LUCIRIN TPO-L from BASF); and combinations thereof.

In some aspects, in addition to monomer component(s), oligomer component(s), photosensitizer(s), and photoinitiator(s), the coating composition includes one or more additives. Additives include an adhesion promoter, a strength additive, an antioxidant, a catalyst, a stabilizer, an optical brightener, a property-enhancing additive, an amine synergist, a wax, a lubricant, and/or a slip agent. Some additives operate to control the polymerization process, thereby affecting the physical properties (e.g., modulus, glass transition temperature) of the polymerization product formed from the coating composition. Other additives affect the integrity of the cured product of the coating composition (e.g., protect against de-polymerization or oxidative degradation).

An adhesion promoter is a compound that facilitates adhesion of the coating and/or coating composition to glass (e.g. the cladding portion of a glass fiber). Suitable adhesion promoters include alkoxysilanes, mercapto-functional silanes, organotitanates, and zirconates. Representative adhesion promoters include mercaptoalkyl silanes or mercaptoalkoxy silanes such as 3-mercaptopropyl-trialkoxysilane (e.g., 3-mercaptopropyl-trimethoxysilane, available from Gelest (Tullytown, Pa.)); bis(trialkoxysilyl-ethyl)benzene; acryloxypropyltrialkoxysilane (e.g., (3-acryloxypropyl)-trimethoxysilane, available from Gelest), methacryloxypropyltrialkoxysilane, vinyltrialkoxysilane, bis(trialkoxysilylethyl)hexane, allyltrialkoxysilane, styrylethyltrialkoxysilane, and bis(trimethoxysilylethyl) benzene (available from United Chemical Technologies (Bristol, Pa.)); see U.S. Pat. No. 6,316,516, the disclosure of which is hereby incorporated by reference in its entirety herein.

The adhesion promoter is present in the coating composition in an amount between 0.02 pph and 10.0 pph, or between 0.05 pph and 4.0 pph, or between 0.1 pph and 4.0 pph, or between 0.1 pph and 3.0 pph, or between 0.1 pph and 2.0 pph, or between 0.1 pph and 1.0 pph, or between 0.5 pph and 4.0 pph, or between 0.5 pph and 3.0 pph, or between 0.5 pph and 2.0 pph, or between 0.5 pph to 1.0 pph.

Representative strength additives include mercapto-functional compounds, such as N-(tert-butoxycarbonyl)-L-cysteine methyl ester, pentaerythritol tetrakis(3-mercaptopropionate), (3-mercaptopropyl)-trimethoxysilane; (3-mercaptopropyl)trimethoxy-silane, and dodecyl mercaptan. The strength additive may be present in the coating composition in an amount less than about 1 pph, or in an amount less than about 0.5 pph, or in an amount between about 0.01 pph and about 0.1 pph.

A representative antioxidant is thiodiethylene bis[3-(3,5-di-tert-butyl)-4-hydroxy-phenyl) propionate] (e.g., IRGANOX 1035, available from BASF).

Representative amine synergists include triethanolamine; 1,4-diazabicyclo[2.2.2]octane (DABCO), triethylamine, and methyldiethanolamine. In an embodiment, an amine synergist is present at a concentration of 0.02 pph-0.5 pph.

EXAMPLES

The following examples illustrate preparation of oligomers in accordance with the present description. Coating compositions that include the oligomers and cured products made from the coating compositions are also described.

Oligomer Synthesis.

Several oligomers were prepared. A series of oligomer Samples in accordance with the present description and an oligomer Control were prepared. The oligomer Samples are labeled BY7, BY8, BY13, BY14, and BY15. The oligomer Control is labeled BY4.

The starting materials used in the synthesis of oligomer Samples BY7, BY8, BY13, BY14, and BY15 were polypropylene glycol, 2-isocyanatoethyl acrylate (IEA), DBTDL (dibutyl tin dilaurate, available from Aldrich), and BHT (2,6-di-tert-butyl-4-methylphenol, available from Aldrich). Polypropylene glycol was obtained from Covestro (Pittsburgh, Pa.) (Product Names: Acclaim 4200, Acclaim 8200, Acclaim 12200N, Acclaim 18200N). The number average molecular weight of polypropylene glycol was ~4000 g/mol for oligomer Sample BY7 (Acclaim 4200), ~8000 g/mol for oligomer Sample BY8 (Acclaim 8200), ~12000 g/mol for oligomer Sample BY13 (Acclaim 12200N), and ~18000 g/mol for oligomer Sample BY14 (Acclaim 18200N). Oligomer Sample BY15 was prepared from a blend of Acclaim 8200 and Acclaim 12200N. Polypropylene glycol with number average molecular weights of ~4000 g/mol, ~8000 g/mol, ~12000, g/mol, and ~18000 g/mol are referred to herein as PPG4000 (Acclaim 4200), PPG8000 (Acclaim 8200), PPG12000 (Acclaim 12200N), and PPG18000 (Acclaim 18200N), respectively. 2-isocyanatoethyl acrylate (IEA) was obtained from Showa Denko (Tokyo, Japan).

Oligomer Sample BY7 was prepared by combining 100 mg BHT and 40 mg DBTDL DBTDL in a 500 mL reaction flask equipped with a thermometer, drierite drying tube, and overhead stirrer. While continuously stirring the contents of the flask, 116.80 g PPG4000 was added dropwise to the flask. After addition of PPG4000, the reaction flask was heated to ~60° C. and 8.20 g IEA was added. The flask was heated to 72° C.-75° C. for 30 min and the reaction was stopped. Completion of the reaction was confirmed by FTIR spectroscopy, which showed an absence of a feature at 2265 $cm^{-1}$ characteristic of a stretching mode of unreacted isocyanate groups.

Oligomer Sample BY8 was prepared by combining 100 mg BHT and 40 mg DBTDL DBTDL in a 500 mL reaction flask equipped with a thermometer, drierite drying tube, and overhead stirrer. While continuously stirring the contents of the flask, 241.38 g PPG8000 was added dropwise to the flask. After addition of PPG8000, the reaction flask was heated to ~60° C. and 8.62 g IEA was added. The flask was heated to 72° C.-75° C. for 45 min and the reaction was stopped. Completion of the reaction was confirmed by FTIR spectroscopy, which showed an absence of a feature at ~2265 $cm^{-1}$ characteristic of a stretching mode of unreacted isocyanate groups.

Oligomer Sample BY13 was prepared by combining 100 mg BHT and 40 mg DBTDL DBTDL in a 500 mL reaction flask equipped with a thermometer, drierite drying tube, and overhead stirrer. While continuously stirring the contents of the flask, 243.92 g PPG12000 was added dropwise to the flask. After addition of PPG12000, the reaction flask was heated to ~60° C. and 6.08 g IEA was added. The flask was heated to 72° C.-75° C. for 45 min and the reaction was stopped. Completion of the reaction was confirmed by FTIR spectroscopy, which showed an absence of a feature at 2265 $cm^{-1}$ characteristic of a stretching mode of unreacted isocyanate groups.

Oligomer Sample BY14 was prepared by combining 100 mg BHT and 40 mg DBTDL DBTDL in a 500 mL reaction flask equipped with a thermometer, drierite drying tube, and overhead stirrer. While continuously stirring the contents of the flask, 246.28 g PPG18000 was added dropwise to the flask. After addition of PPG18000, the reaction flask was heated to ~60° C. and 3.72 g IEA was added. The flask was heated to 72° C.-75° C. for 45 min and the reaction was stopped. Completion of the reaction was confirmed by FTIR spectroscopy, which showed an absence of a feature at ~2265 $cm^{-1}$ characteristic of a stretching mode of unreacted isocyanate groups.

Oligomer Sample BY15 was prepared by combining 100 mg BHT and 40 mg DBTDL DBTDL in a 500 mL reaction flask equipped with a thermometer, drierite drying tube, and overhead stirrer. While continuously stirring the contents of the flask, sequential dropwise addition of 122.0 g PPG12000 followed by 120.7 g PPG8000 was to the flask was completed. After addition of PPG12000 and PPG8000, the reaction flask was heated to ~60° C. and 7.35 g IEA was added. The flask was heated to 72° C.-75° C. for 45 min and the reaction was stopped. Completion of the reaction was confirmed by FTIR spectroscopy, which showed an absence of a feature at ~2265 $cm^{-1}$ characteristic of a stretching mode of unreacted isocyanate groups.

The starting materials used for the synthesis oligomer Control BY4 were PPG4000 as described above, H12MDI (4,4'-methylene bis(cyclohexyl isocyanate), available from Aldrich), HEA (2-hydroxyethyl-acrylate, available from Aldrich), DBTDL (dibutyl tin dilaurate, available from Aldrich), and BHT (2,6-di-tert-butyl-4-methylphenol, available from Aldrich).

Oligomer Control BY4 was prepared by combining 28.24 g H12MDI, 100 mg BHT, and 40 mg DBTDL in a 500 mL reaction flask equipped with a thermometer, drierite drying tube, and overhead stirrer. While continuously stirring the contents of the flask, 208.32 g PPG4000 was added dropwise over a period of ~20 min using a funnel. The temperature of the contents of the flask was monitored and controlled to prevent excess heating (arising from the exothermicity of the reaction). After completion of the addition of PPG4000, the reaction flask was placed in an oil bath pre-heated to a temperature of 72° C.-76° C. The flask remained in the oil bath for 1-1.5 hr. At various time intervals during heating in the oil bath, aliquots of the reaction mixture were extracted for analysis by FTIR spectroscopy to monitor the progress of the reaction through detection of an isocyanate stretching mode at ~2265 cm$^{-1}$. As the reaction proceeds, the concentration of unreacted isocyanate groups decreases. The reaction flask was removed from the oil bath when the intensity of the isocyanate stretching mode levelled off. The reaction flask was allowed to cool below 70° C. and 13.44 g HEA was added dropwise with a pipette over a time period of 2-5 min. After addition of HEA, the reaction flask was returned to the oil bath and heated at 72° C.-76° C. for 4-6 hrs. Aliquots of the reaction mixture were extracted at various times to monitor the intensity of the isocyanate stretching mode at ~2265 cm$^{-1}$. The reaction was stopped when the intensity of the isocyanate stretching mode decreased to below the detection limit.

The oligomer Samples and oligomer Control were characterized by GPC (gel permeation chromatography) and NMR spectroscopy.

Gel Permeation Chromatography.

A Waters Alliance 2690 GPC instrument was used to characterize the oligomers prepared in these examples. The mobile phase was THF. The instrument included a series of three Polymer Labs columns. Each column had a length of 300 mm and an inside diameter of 7.5 mm. Two of the columns (columns 1 and 2) were sold under Part No. PL1110-6504 by Agilent Technologies and were packed with PLgel Mixed D stationary phase (polystyrene divinyl benzene copolymer, average particle size=5 μm, specified molecular weight range=200-400,000 g/mol). The third column (column 3) was sold under Part No. PL1110-6520 by Agilent Technologies and was packed with PLgel 100A stationary phase (polystyrene divinyl benzene copolymer, average particle size=5 μm, specified molecular weight range=up to 4,000 g/mol). The columns were calibrated with polystyrene standards ranging from 162-6,980,000 g/mol using EasiCal PS-1 & 2 polymer calibrant kits (Agilent Technologies Part Nos. PL2010-505 and PL2010-0601). The GPC instrument was operated under the following conditions: flow rate=1.0 mL/min, column temperature=40° C., injection volume=100 μL, and run time=35 min (isocratic conditions). The detector was a Waters Alliance 2410 differential refractometer operated at 40° C. and sensitivity level 4. The samples were injected twice along with a THF+0.05% toluene blank

Figure 1:
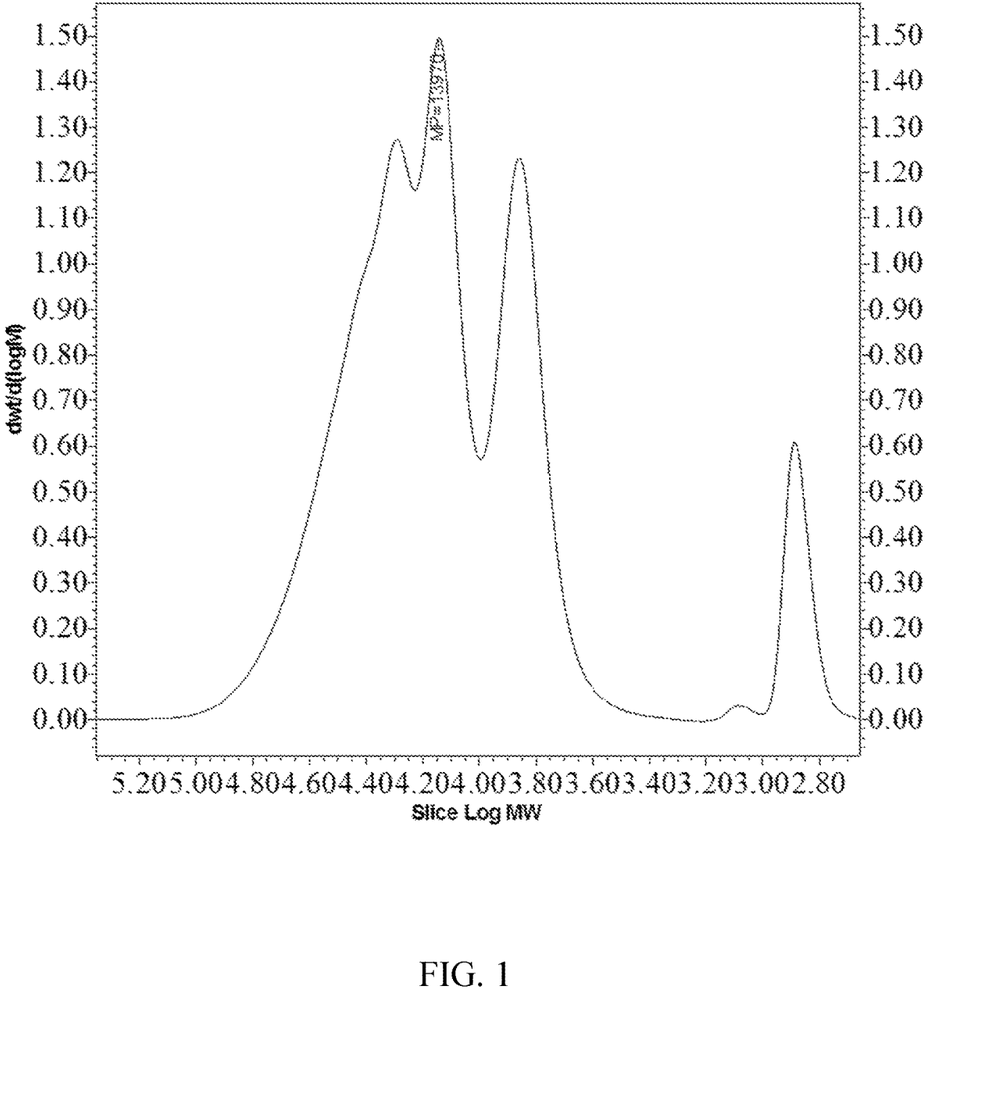
FIG. 1 shows GPC results for an oligomer Control.
Figure 2:
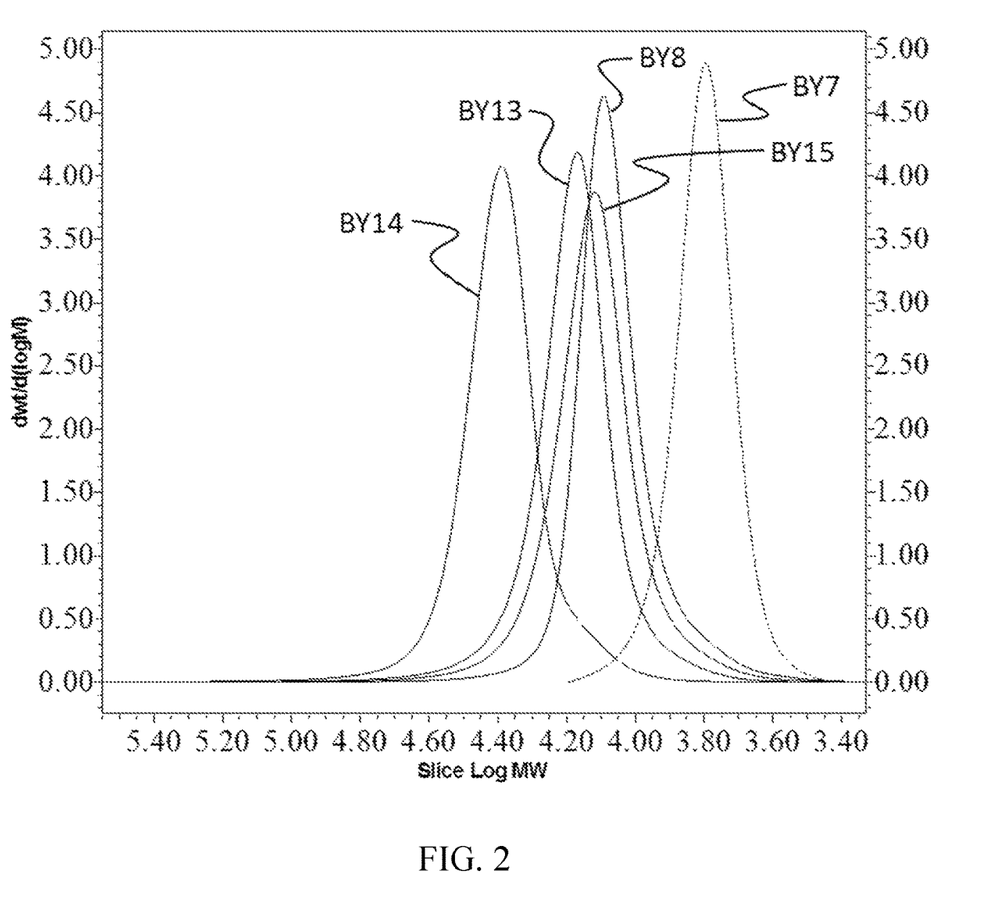
FIG. 2 shows GPC results for five oligomer Samples.

GPC samples were prepared by diluting ~0.10 g of oligomer in THF to obtain a ~1.5 g test solution. Test solutions were prepared from oligomer Samples BY7, BY8, BY13, BY14, BY15, and oligomer Control BY4. The test solutions were run through the GPC instrument. Results are shown in FIG. 1 for the oligomer Control and in FIG. 2 for the oligomer Samples. Multiple GPC peaks were observed for the oligomer Control. The presence of multiple peaks indicates that the oligomer Control included multiple components spanning a wide distribution of molecular weight. The GPC results for the oligomer Samples, in contrast, show relatively narrow and symmetric peaks at positions corresponding to molecular weight. The GPC results are consistent with a more uniform oligomer product with limited variability in reaction product. GPC results demonstrate a significant difference in the distribution of reaction products for oligomers made in accordance with the present description and oligomers prepared from the conventional reaction scheme. The conventional reaction scheme produces oligomers with multiple components distributed over a wide range of molecular weights, while the present reaction scheme produces relatively homogeneous oligomers with little variability in molecular weight.

NMR Spectroscopy.

Figure 3:
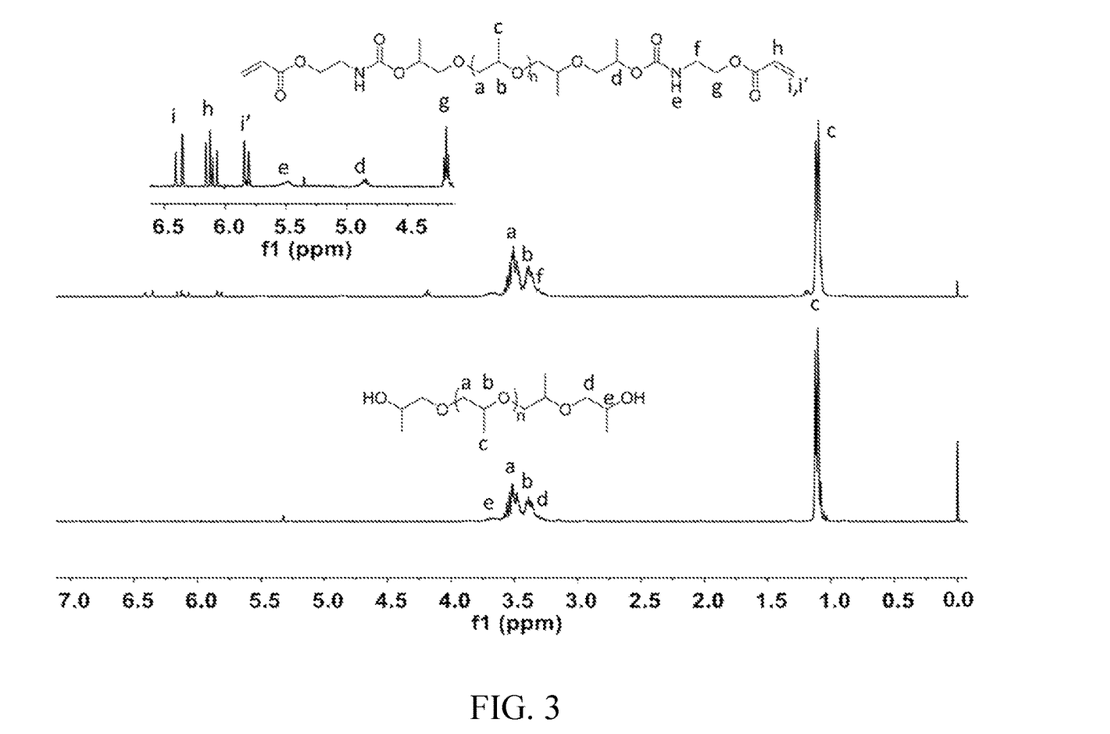
FIG. 3 shows an NMR spectrum for oligomer Sample BY7.

Oligomer Samples BY7, BY8, BY13, BY14, and BY15 were characterized by NMR spectroscopy to assess structure. A typical NMR spectrum is shown in FIG. 3, which shows the NMR spectrum for oligomer Sample BY7. Analogous results were obtained for oligomer Samples BY8, BY13, BY14, and BY15.

Coating Compositions.

Coating compositions were formulated using oligomer Samples BY7, BY8, BY13, BY14, and BY15 as well as with selected combinations of the oligomer Samples. Eighteen coating compositions were formulated. Each coating composition included 2.0 wt % NVC (N-vinylcaprolactam) (a monofunctional monomer), 1.5 wt % TPO ((2,4,6-trimethylbenzoyl)diphenyl phosphine oxide, a photoinitiator), 1.0 pph Irganox 1035 (thiodiethylene bis[3-(3,5-di-tert-butyl)-4-hydroxy-phenyl) propionate, an antioxidant), 0.8 pph 3-mercaptopropyl trimethoxysilane (an adhesion promoter), and 0.032 pph pentaerythritol tetrakis(3-mercaptopropionate) (a strength additive). The remaining components of each coating composition are listed in Table 1 and Table 2. In Table 1 and Table 2, M164 refers to ethoxylated(4)nonyl phenol acrylate (a monofunctional monomer with the structure indicated at formula (14)), Photomer 4184 refers to 2-[[(butylamino)carbonyl]oxy]ethyl acrylate with the structure indicated at formula (15), and EB130 refers to tricyclodecanediol diacrylate with the structure indicated at formula (16).

(14)

(15)

(16)

TABLE 1

Coating Compositions 1-8

| Coating Composition | Oligomer (wt %) | M164 (wt %) | Photomer 4184 (wt %) |
|---|---|---|---|
| 1 | BY7 (50.0) | 46.5 | — |
| 2 | BY7 (96.5) | — | — |

TABLE 1-continued

Coating Compositions 1-8

| Coating Composition | Oligomer (wt %) | M164 (wt %) | Photomer 4184 (wt %) |
|---|---|---|---|
| 3 | BY8 (76.5) | 20.0 | — |
| 4 | BY8 (79.5) | 17.0 | — |
| 5 | BY8 (81.5) | 15.0 | — |
| 6 | BY8 (96.5) | — | — |
| 7 | BY8 (86.5) | — | 10.0 |
| 8 | BY8 (76.5) BY7 (20.0) | — | — |
| 9 | BY8 (91.5) BY7 (5.0) | — | — |

TABLE 2

Coating Compositions 9-16

| Coating Composition | Oligomer (wt %) | M164 (wt %) | EB130 (wt %) |
|---|---|---|---|
| 10 | BY13 (96.5) | — | — |
| 11 | BY13 (86.5) BY7 (10.0) | — | — |
| 12 | BY13 (48.25) BY8 (48.25) | — | — |
| 13 | BY13 (94.0) | — | 2.5 |
| 14 | BY14 (96.5) | — | — |
| 15 | BY14 (71.5) BY7 (25.0) | — | — |
| 16 | BY14 (21.5) BY8 (75.0) | — | — |
| 17 | BY14 (31.5) BY8 (65.0) | — | — |
| 18 | BY15 (96.5) | — | — |

Coatings compositions #1-#18 were separately formulated using a high-speed mechanical mixer in an appropriate container. The components of each composition were charged into the container, which was heated to 60° C. The components mixed by stirring until all solids were dissolved and the mixture appeared homogeneous.

The following several paragraphs describe the experimental techniques used to measure various properties of thin film samples formed by curing the coating compositions. The results are presented following the discussion of experimental techniques.

Young's Modulus, % Elongation, and Tensile Strength.

Young's modulus, % Elongation, and tensile strength were measured on films formed by curing the coating compositions. Wet films of the coating composition were cast on silicone release paper using a draw-down box having a gap thickness of about 0.005". The wet films were cured with a UV dose of 1.2 J/cm² (measured over a wavelength range of 225-424 nm by a Light Bug model IL490 from International Light) using a Fusion Systems UV curing apparatus with a 600 W/in D-bulb (50% Power and approximately 12 ft/min belt speed) to yield cured coatings in film form. Cured film thickness was between about 0.0030" and 0.0035".

The films were allowed to age (23° C., 50% relative humidity) for at least 16 hours prior to testing. Film samples were cut to dimensions of 12.5 cm×13 mm using a cutting template and a scalpel. Young's modulus, % Elongation (% strain at break) and tensile strength were measured on the film samples using a MTS Sintech tensile test instrument following procedures set forth in ASTM Standard D882-97. Films were tested at an elongation rate of 2.5 cm/min with the initial gauge length of 5.1 cm. Young's modulus was defined as the steepest slope of the beginning of the stress-strain curve.

Glass Transition Temperature.

Glass transition temperatures were measured for the films by determining the peak of the tan δ curves obtained from a Seiko-5600 test instrument in tension. The test methodology is based on DMA (dynamic mechanical analysis). Film samples were cut to a length of 10 mm and a width of 10 mm. Film samples were individually inserted into the sample compartment of the test instrument cooled to approximately −85° C. Once the temperature was stable, a temperature ramp was run using the following parameters:

Frequency: 1 Hz
Strain: 0.3%
Heating Rate: 2° C./min
Final Temperature: 150° C.
Initial Static Force=20.0 [g]
Static>Dynamic Force by=10.0 [%]

$T_g$ is defined as the maximum of the tan δ peak, where the tan δ peak is defined as:

$$\tan \delta = E''/E'$$

where E" is the loss modulus, which is proportional to the loss of energy as heat in a cycle of deformation, and E' is the storage or elastic modulus, which is proportional to the energy stored in a cycle of deformation.

Tear Strength.

Tear strength ($G_c$) is related to the force required to break the coating when the coating is under tension. The technique is described more fully below and with the technique, tear strength can be calculated from Eq. (5):

$$G_c = \frac{\left(\frac{F_{break}}{B \cdot d} \cdot C \cdot \sqrt{\pi \frac{b}{2}}\right)^2}{S} \tag{5}$$

where $F_{break}$ is the force at break, b is the slit length, d is the film thickness, B is the width of the test piece. B and b are instrument parameters with values given below. S is the segment modulus calculated from the stresses at elongations of 0.05% and 2%, and C is a sample geometry factor defined as follows for the technique used herein to determine tear strength:

$$C = \sqrt{\frac{1}{\cos\left(\frac{\pi b}{2B}\right)}} \tag{6}$$

Tear strength ($G_c$) was measured with a MTS Sintech tensile tester. Each coating composition was cast on a glass plate with the aid of a draw-down box having a gap thickness of about 0.005" and immediately cured under UV irradiation using a dose of 1 J/cm². The shape and dimensions of the cured films were prepared according to the International Standard ISO 816 (second edition 1983 Dec. 1) "Determination of tear strength of small test pieces (Delft test pieces)". The cured films were conditioned at 23° C.±2° C. and 50% relative humidity (RH) for at least 16 hours. The initial gauge length was 5.0 cm and test speed was set at 0.1 mm/min. Three to five specimens of each film were tested. Tear strength ($G_c$) was calculated from Eqs. (1) and (2). For the test instrument used in the measurements, slit length b was 5.0 mm, width B of the test piece was 9.0 mm, and sample geometry factor C was 1.247.

Results.

The Young's modulus, % Elongation, and tensile strength of cured films made from the coating compositions are listed in Table 3. Tear strength and glass transition temperature were also measured for cured films made from selected coating compositions.

TABLE 3

Properties of Cured Films

| Coating Composition | Young's Modulus (MPa) | % Elongation | Tensile Strength (MPa) | Tear Strength (J/m²) | $T_g$ (° C.) |
|---|---|---|---|---|---|
| 1 | 0.66 ± 0.04 | 64 ± 3.0 | 0.26 ± 0.02 | 19 ± 3 | −35.7 |
| 2 | 2.08 ± 0.04 | 55 ± 8.1 | 0.74 ± 0.07 | | |
| 3 | 0.75 ± 0.02 | 126.2 ± 28.9 | 0.43 ± 0.06 | | −54.3 |
| 4 | 0.80 ± 0.01 | 125.8 ± 22.3 | 0.46 ± 0.05 | 29 ± 3 | −55.0 |
| 5 | 0.87 ± 0.02 | 105.1 ± 19.3 | 0.44 ± 0.04 | | −55.5 |
| 6 | 1.23 ± 0.03 | 99.9 ± 18.4 | 0.61 ± 0.08 | | −58.5 |
| 7 | 0.95 ± 0.016 | 110 ± 23.5 | 0.53 ± 0.084 | | |
| 8 | 1.11 ± 0.014 | 86 ± 18.3 | 0.52 ± 0.07 | | |
| 9 | 0.94 ± 0.015 | 102 ± 11.0 | 0.48 ± 0.03 | | |
| 10 | 0.50 ± 0.006 | 176 ± 27.3 | 0.35 ± 0.04 | | |
| 11 | 0.63 ± 0.005 | 163 ± 24.4 | 0.43 ± 0.045 | 29 ± 2 | −59.9 |
| 12 | 0.68 ± 0.01 | 170 ± 24.2 | 0.48 ± 0.04 | 30 ± 3 | −59.0 |
| 13 | 0.76 ± 0.02 | 144 ± 20.0 | 0.48 ± 0.04 | 29 ± 2 | −58.0 |
| 14 | 0.20 ± 0.005 | 957 ± 87.7 | 0.50 ± 0.073 | | |
| 15 | 0.62 ± 0.012 | 178 ± 38 | 0.44 ± 0.072 | | |
| 16 | 0.86 ± 0.015 | 135 ± 39 | 0.51 ± 0.098 | 30 ± 1 | −58.5 |
| 17 | 0.77 ± 0.007 | 147 ± 15.9 | 0.48 ± 0.031 | | −59.2 |
| 18 | 0.73 ± 0.004 | 152 ± 15.5 | 0.47 ± 0.033 | 26 ± 1 | −58.8 |

Cured products formed from coating compositions including one or more of the present oligomers, when configured as a film having a thickness between 0.0030" and 0.0035", have a Young's modulus less than 1.0 MPa, or less than 0.75 MPa, or less than 0.50 MPa, or less than 0.25 MPa, or in the range from 0.15 MPa-1.0 MPa, or in the range from 0.25 MPa-0.90 MPa, or in the range from 0.35 MPa-0.80 MPa.

Cured products formed from coating compositions including one or more of the present oligomers, when configured as a film having a thickness between 0.0030" and 0.0035", have a tensile strength greater than 0.25 MPa, or greater than 0.35 MPa, or greater than 0.45 MPa, or greater than 0.55 MPa, or greater than 0.65 MPa, or in the range from 0.25 MPa-0.85 MPa, or in the range from 0.30 MPa-0.75 MPa, or in the range from 0.35 MPa-0.65 MPa.

Cured products formed from coating compositions including one or more of the present oligomers, when configured as a film having a thickness between 0.0030" and 0.0035", have a tear strength greater than 20 J/m², or greater than 23 J/m², or greater than 26 J/m², or greater than 29 J/m², or in the range from 20 J/m²-33 J/m², or in the range from 22 J/m²-30 J/m², or in the range from 24 J/m²-28 J/m².

Cured products formed from coating compositions including one or more of the present oligomers, when configured as a film having a thickness between 0.0030" and 0.0035", have a glass transition temperature $T_g$ less than −30° C., or less than −35° C., or less than −40° C., or less than −45° C., or less than −50° C., or less than −55° C., or in the range from −30° C. to −65° C., or in the range from −35° C. to −60° C., or in the range from −40° C. to −60° C.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or description that the steps are to be limited to a specific order, it is no way intended that any particular order be inferred.

It will be apparent to those skilled in the art that various modifications and variations can be made without departing from the spirit or scope of the illustrated embodiments. Since modifications, combinations, sub-combinations and variations of the disclosed embodiments that incorporate the spirit and substance of the illustrated embodiments may occur to persons skilled in the art, the description should be construed to include everything within the scope of the appended claims and their equivalents.

What is claimed is:

1. A method for making an oligomer, comprising:
reacting a first precursor with a first polyol, a second polyol, and a first diol;
wherein the first precursor reacts with the first polyol to form a first urethane compound, the first polyol including two or more OH groups and a repeating alkoxylene group, the first precursor including an isocyanate group and a curable functional group; and
wherein the first precursor reacts with the second polyol to form a second urethane compound, the second polyol including two or more OH groups and a repeating alkoxylene group, wherein a molecular weight of the first polyol is greater than a molecular weight of the second polyol by at least 2500 g/mol; and
wherein the first precursor reacts with the first diol to form a third urethane compound; and
wherein a ratio of a molar amount of the first polyol to a molar amount of the first diol is greater than 10:1.

2. The method of claim 1, wherein the repeating alkoxylene group of the first polyol comprises a linear or branched alkylene group.

3. The method of claim 1, wherein the first polyol has a molecular weight greater than 3000 g/mol and the first precursor has a molecular weight less than 500 g/mol.

4. The method of claim 1, wherein the curable functional group is an acrylate or methacrylate group.

5. The method of claim 1, wherein the first precursor comprises only one curable functional group.

6. The method of claim 1, wherein the first precursor has a formula:

and wherein CFG is the curable functional group, $R_2$ is an organic group.

7. The method of claim 6, wherein $R_2$ comprises an alkylene linkage, an ether linkage, an ester linkage, an amine linkage or an amide linkage.

8. The method of claim 1, wherein the first precursor has a molecular weight less than 500 g/mol and the first polyol has a molecular weight greater than 5000 g/mol.

9. The method of claim 1, wherein the first diol has a molecular weight less than 1000 g/mol and the first polyol has a molecular weight greater than 5000 g/mol.

10. The method of claim 9, further comprising reacting the first precursor with a second diol.

11. The product of the method of claim 1.

12. A coating composition comprising:
an oligomer, the oligomer comprising a first urethane compound, the first urethane compound formed from a reaction of a first polyol with a first precursor, the first polyol including two or more OH groups and a repeating alkoxylene group, the first precursor including an isocyanate group and a curable functional group, the oligomer further comprising a second urethane compound, the second urethane compound formed by a reaction of the first precursor with a second polyol, the second polyol including two or more OH groups and a repeating alkoxylene group, the second polyol and the first polyol differing in molecular weight by at least 2000 g/mol, the oligomer further comprising a third urethane compound, the third urethane compound formed by a reaction of the first precursor with a first diol, a ratio of a molar amount of the first polyol to a molar amount of the first diol being greater than 10:1 in the coating composition; and a photoinitiator.

13. The coating composition of claim 12, wherein the first precursor has a formula $$O{=}C{=}N{-}R_2{-}CFG$$

and wherein CFG is the curable functional group, $R_2$ is an organic group.

14. The coating composition of claim 13, wherein the first polyol has a formula $$H{-}O{-}[R_1{-}O]_n{-}H \qquad (1)$$

and wherein CFG is an acrylate group, $R_1$ is a linear or branched alkylene group, and n is greater than 20.

15. The coating composition of claim 12, wherein the oligomer further comprises a fourth urethane compound, the fourth urethane compound formed by a reaction of the first polyol with a second precursor, the second precursor including an isocyanate group and a curable functional group, the second precursor differing from the first precursor.

* * * * *

UNITED STATES PATENT AND TRADEMARK OFFICE
CERTIFICATE OF CORRECTION

PATENT NO.         : 11,028,214 B2                                                    Page 1 of 1
APPLICATION NO.    : 16/245736
DATED              : June 8, 2021
INVENTOR(S)        : Yangbin Chen et al.

It is certified that error appears in the above-identified patent and that said Letters Patent is hereby corrected as shown below:

In the Claims

In Column 23, Line 22, Claim 14, before "and" delete "(1)".

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*